United States Patent [19]

Yagyu et al.

[11] Patent Number: 5,255,218
[45] Date of Patent: Oct. 19, 1993

[54] OPTICAL FREQUENCY MULTIPLE SIGNAL PROCESSING METHOD

[75] Inventors: Eiji Yagyu; Tetsuya Nishimura; Motomu Yoshimura; Noriaki Tsukada, all of Amagasaki, Japan

[73] Assignee: Mitsubishi Denki Kabushiki Kaisha, Tokyo, Japan

[21] Appl. No.: 762,572

[22] Filed: Sep. 19, 1991

[30] Foreign Application Priority Data

Sep. 26, 1990 [JP] Japan ............................ 2-259331

[51] Int. Cl.⁵ .................................... G11C 13/00
[52] U.S. Cl. ............................ 365/119; 365/106
[58] Field of Search ............ 365/106, 119, 120, 121, 365/215, 234

[56] References Cited

U.S. PATENT DOCUMENTS

| | | | |
|---|---|---|---|
| 3,550,096 | 12/1970 | Alphonse et al. | 365/119 |
| 4,101,976 | 7/1978 | Castro et al. | 365/119 |
| 4,819,206 | 4/1989 | Yoshimura | 365/106 |
| 5,032,973 | 7/1991 | Yoshimura | 365/119 |

OTHER PUBLICATIONS

P. C. Becker et al, "Optical Stark Effect in Organic Dyes Probed with Optical Pulses of 6-fs Duration," Physical Review Letters, vol. 60, No. 24, Jun. 12, 1988.

*Primary Examiner*—Joseph A. Popek
*Attorney, Agent, or Firm*—Wolf, Greenfield & Sacks

[57] ABSTRACT

A frequency multiple outgoing light is obtained by intensity-modulating a frequency multiple incident light in frequency domain, after irradiating a pump beam to an optical recording medium consisting of photochromic material and the like to generate optical Stark effect thereon and shifting the light absorption spectrum of the optical recording medium by optical Stark effect.

22 Claims, 9 Drawing Sheets t=t0 t=t1 t=t2 t=t3 t=t4

$\omega = \omega i1$ $\omega = \omega i2$ $\omega = \omega i3$ $\omega = \omega i4$

OPTICAL FREQUENCY MULTIPLE SIGNAL PROCESSING METHOD

BACKGROUND OF THE INVENTION

1. Field of the Invention

The present invention relates to an optical frequency multiple signal processing method of processing at high speed an optical frequency multiple signal multiplexed in frequency domain.

2. Description of Related Art

FIG. 1 is a schematic view showing a construction of a conventional optical frequency multiple signal recording apparatus shown, for example, in U.S. Pat. No. 4,101,976 (1978). In the figure, reference numeral 10 designates a laser generating a laser beam of variable wavelength and the frequency of laser beam generated from the laser 10 is varied by a scanner 11. A filter 12 making only laser beam of selected frequency to pass therethrough, a filter 13 modulating irradiating condition of the outgoing light from the laser 10, an optical recording medium 14 recording a signal, and a photo detector 15 detecting a light having passed through the optical recording medium 14 are optically connected with the laser 10 in this order. The filter 13 modulates the irradiation intensity and irradiation time of the outgoing light from the laser 10 so that a new signal may not be recorded in the optical recording medium 14 in regenerating a signal from the optical recording medium 14.

Next, explanation will be given on the operation. FIG. 2(a) shows a light absorption spectrum of the optical recording medium 14 before the recording of signal. The optical recording medium 14 has optical saturation characteristic and has an inhomogeneous broadening of absorption line in optical frequency band $\omega A - \omega B$, and when it receives light, there is generated a photo-induced reaction. The photo-induced reaction is a photochromic reaction or a photo-chemical reaction.

When light of intense spectral distribution as shown in FIG. 2(b) is irradiated to the optical recording medium 14, dips are generated in the light absorption spectrum as shown in FIG. 2(c), and there is generated a spectral hole (hereinafter to be called a hole). This phenomena is known as photochemical hole burning, and signals are multiplexed and recorded in frequency domain according to the presence of the hole.

Signals are recorded by the fact that the light generated at the laser 10 is frequency-selected by the scanner 11 and the filter 12, thereby to generate holes successively in the optical recording medium 14. And in regenerating recorded signal, the light generated at the laser 10 is frequency-scanned over a band of $\omega A - \omega B$. At this time, the irradiation time and irradiation intensity of the light generated at the laser 10 is modulated by the filter 13 in order to prevent a hole burning from generating in recording signal. Owing to the frequency scanning, the output of the photo detector 15 shows its peak when the frequency of the light generated at the laser 10 coincides with the frequency corresponding to the respective holes, thereby regenerating signal can be obtained in time sequence.

As the conventional optical frequency multiple signal recording apparatus is so constructed as abovementioned, there is a problem that an optical signal processing apparatus conventionally used does not cope with optical frequency multiple signal recording using multiple signal of such a specific frequency domain.

In addition, in regenerating signal recorded in the optical recording medium, as light for regenerating signal must be frequency-scanned, there are problems that a device performing the frequency-scanning of light is needed and also a long time is required for the frequency-scanning of light.

SUMMARY OF THE INVENTION

The present invention has been devised in order to solve the two problems as abovementioned.

An object of the invention is to provide an optical frequency multiple signal processing method capable of performing a signal processing for optional frequency multiple incident light.

Another object of the invention is to provide an optical frequency multiple signal processing method capable of regenerating signal multiplexed in frequency domain from an optical recording medium at high speed, without a frequency-scanning of light for regenerating signal.

According to the optical frequency multiple signal processing method of the invention, a pump beam is irradiated to an optical recording medium, thereby optical Stark effect is generated thereon. Then, due to optical Stark effect, light absorption spectrum of the optical recording medium is shifted, and according to this shift, a frequency multiple incident light is to be intensity-modulated in frequency domain, thereby an intensity-modulated frequency multiple outgoing light is obtained in frequency domain.

The above and further objects and features of the invention will more fully be apparent from the following detailed description with accompanying drawings.

DESCRIPTION OF THE PREFERRED EMBODIMENTS

In the following, description will be made on the present invention referring to drawings showing embodiments thereof.

Figure 1:
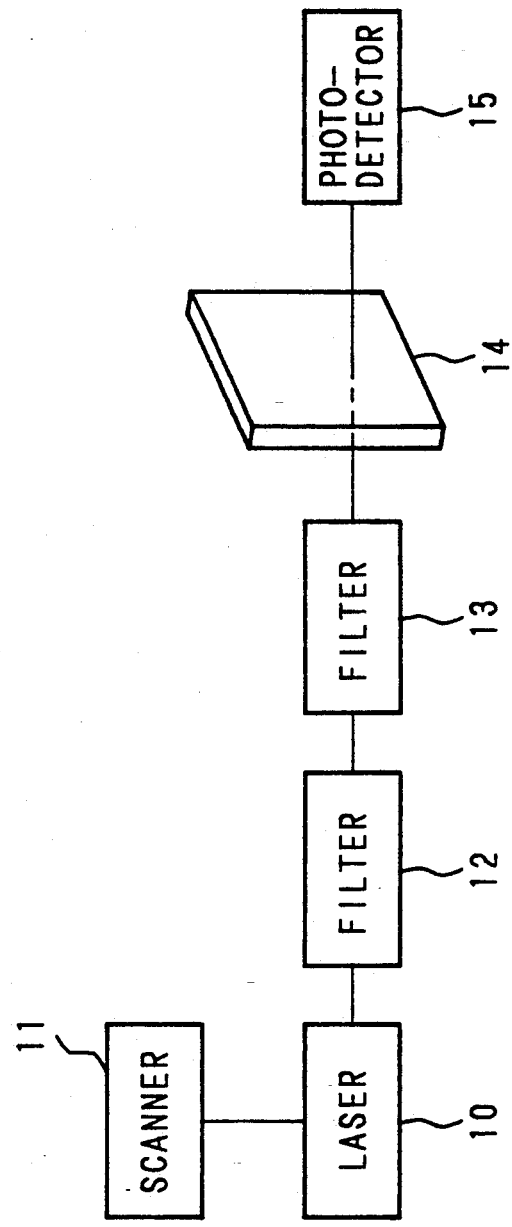
FIG. 1 is a schematic view showing a construction of a conventional optical frequency multiple signal recording apparatus.
Figure 2A:
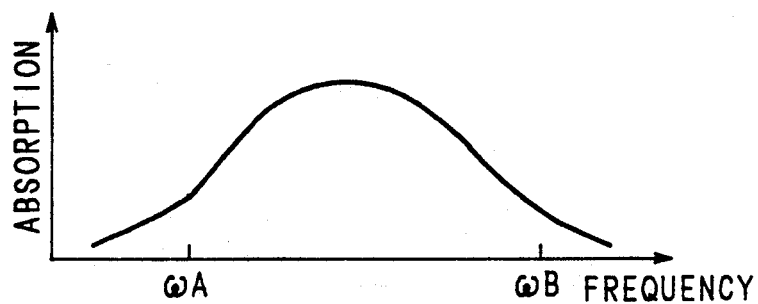
FIGS. 2(a)–2(c) are explanatory views showing light absorption spectrum of an optical recording medium in the conventional apparatus.
Figure 2B:
Figure 2C:
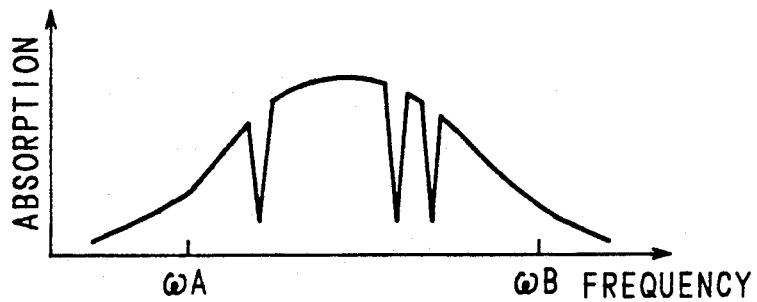
Figure 3:
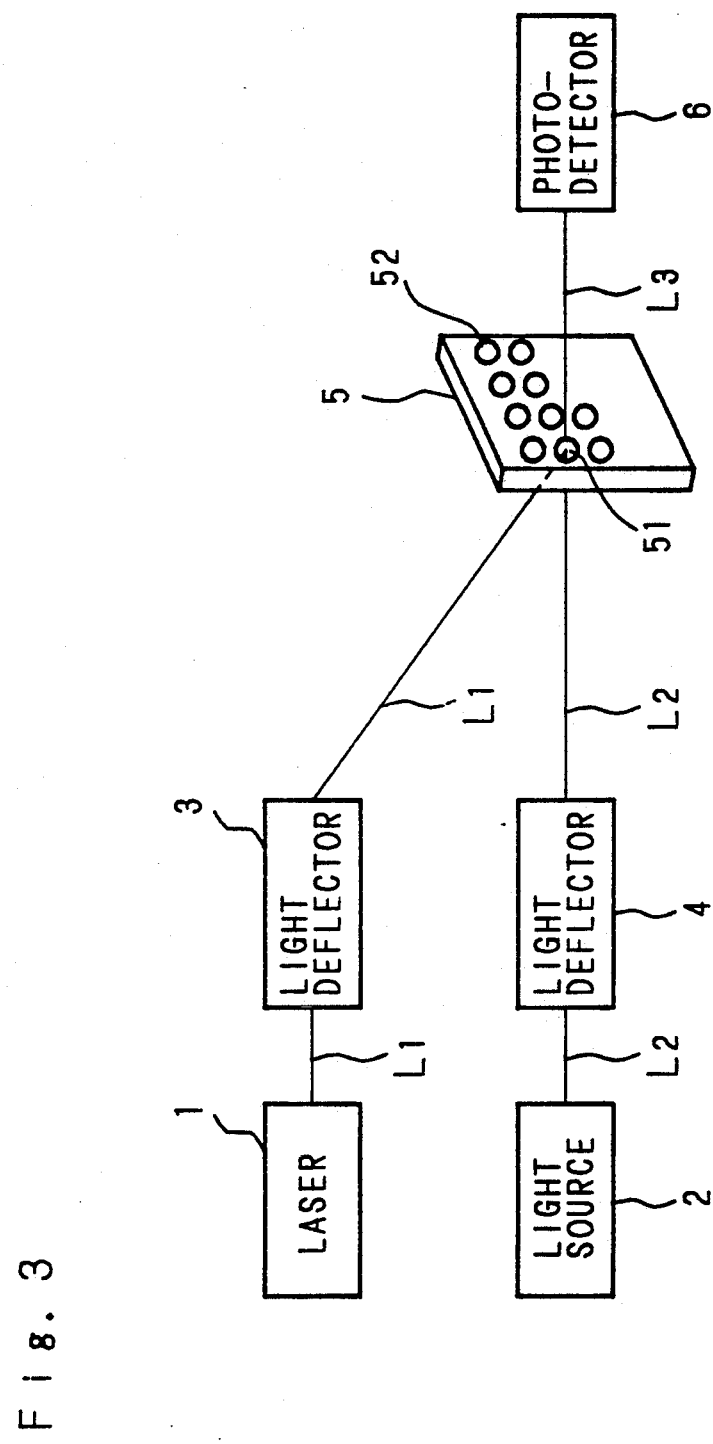
FIG. 3 is a schematic view showing a construction of an optical frequency multiple signal recording apparatus of the invention.

FIG. 3 is a schematic view showing a construction of a recording apparatus utilizing an optical frequency multiple signal processing method of the invention. In the figure, reference numeral 1 designates a laser generating a pump laser beam L1. The pump laser beam L1 is deflected by a light deflector 3, then is irradiated to each recording region at an optical recording medium 5 having many recording regions 51, 52 . . . And in the figure, reference numeral 2 designates a light source emitting a frequency multiple incident light L2 (or an optical signal processing device in front stage). The frequency multiple incident light L2 is deflected by a light deflector 4, then is irradiated to each recording region at the optical recording medium 5. In addition, numeral 6 in the figure designates a photo-detector (or an optical signal processing device in rear stage) detecting a frequency multiple outgoing light L3 having been intensity-modulated in frequency region.

Next, explanation on the operation will be given.

Figure 4A:
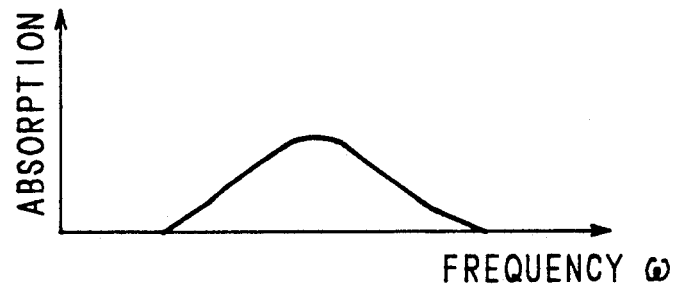
FIGS. 4(a)–4(g) are explanatory views of optical Stark effect.

FIG. 4(a) shows the light absorption spectrum, in the state where the pump laser beam L1 is not irradiated, of the specific recording region 51 of the optical recording medium 5. After the pump laser beam L1 of ωp frequency from the laser 1 is deflected by the light deflector 3, the pump laser beam L1 is incident upon the recording region 51 of the optical recording medium 5, thereby optical Stark effect is generated at the recording region 51. Then light absorption spectrum at the recording region 51 is shifted according to intensity of the pump laser beam L1. The absorption-frequency shift amount Δ for the molecules with a transition frequency ωi in the state where the pump laser beam L1 is not irradiated is given by $$\Delta = \omega p - \omega i + \delta \qquad (1)$$

where $$\delta = [(\omega i - \omega p)^2 + \Omega^2]^{\frac{1}{2}} \qquad (1)$$

Here, Ω designates Rabi frequency given by the following equation (2), with $\vec{\mu}$ as transition moment between ground state and pump state of the optical recording medium 5, $\vec{E}(\omega p) \cos(\omega pt)$ as pump electric field caused by the pump laser beam L1, and h as Planck's constant.

$$\Omega = \vec{\mu} \cdot \vec{E}(\omega p)/h \qquad (2)$$

Figure 4B:
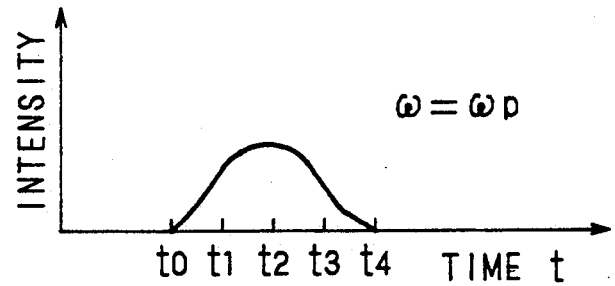
Figure 4C:
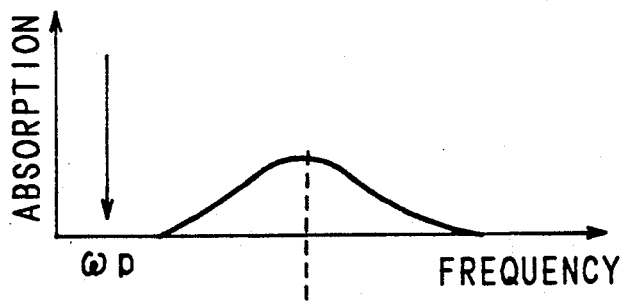
Figure 4D:
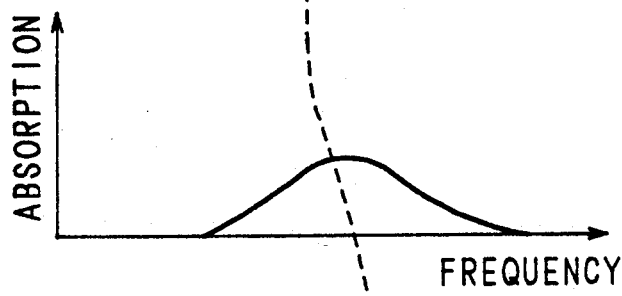
Figure 4E:
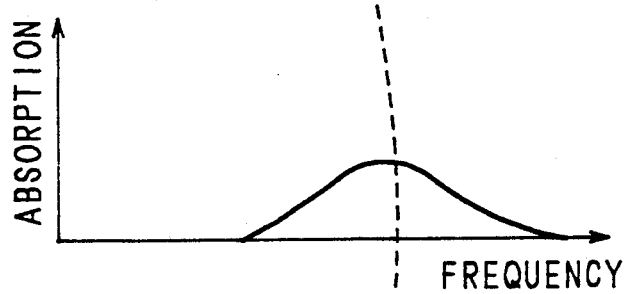
Figure 4F:
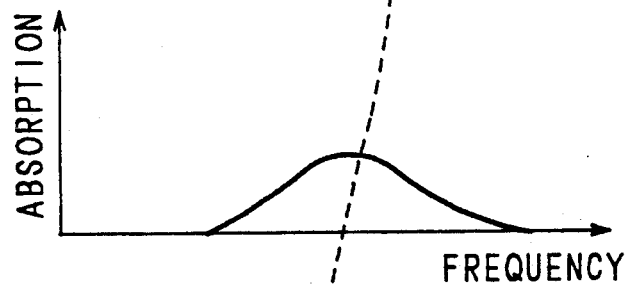
Figure 4G:
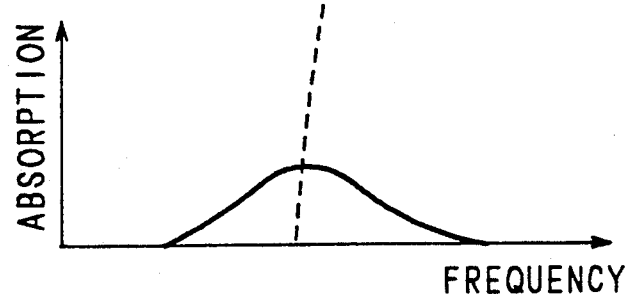

Accordingly, the intensity of the pump laser beam L1 changes as shown in FIG. 4(b) in course of time, the light absorption spectrum of the recording region 51 shifts as shown in FIG. 4(c), (d), (e), (f), (g) in course of time on the basis of the abovementioned equation (1), corresponding to the intensity of the pump laser beam L1.

Here, materials which cause change of light absorption spectrum by some method; materials which are sensitive to an applied field and cause a photo-induced reaction such as a photochromic reaction and a photo-chemical reaction, or an electric-induced reactions such as electro-chromic reaction, for example, are used for the optical recording medium 5.

The figure of the light absorption spectrum of the recording region 51 is made to change into a suitable one, and the pump laser beam L1 and the frequency multiple incident light L2 are irradiated to the recording region 51. Then due to a shift of light absorption spectrum caused by optical Stark effect of the recording region 51, the frequency multiple incident light L3 is obtained by intensity-modulating the frequency multiple incident light L2 in frequency region corresponding to the figure of light absorption spectrum of the recording region 51 and the intensity of the pump laser beam L1.

Figure 5A:
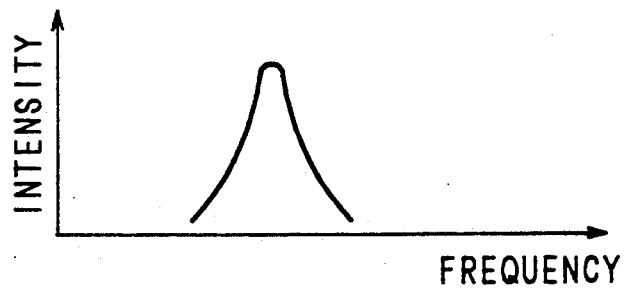
FIGS. 5(a)–5(k) are views showing a modulation state of frequency multiple incident light in one embodiment.
Figure 5B:
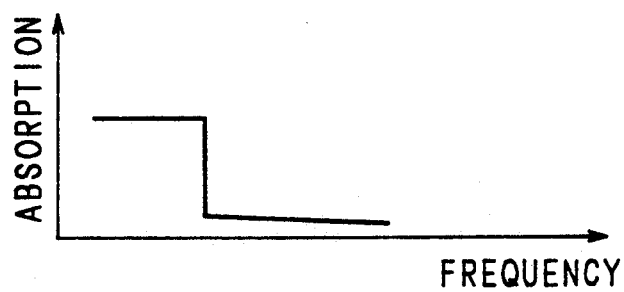
Figure 5C:
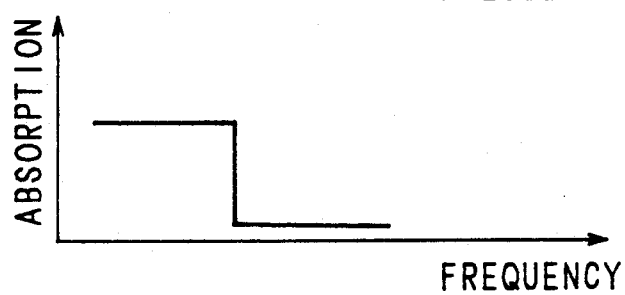
Figure 5D:
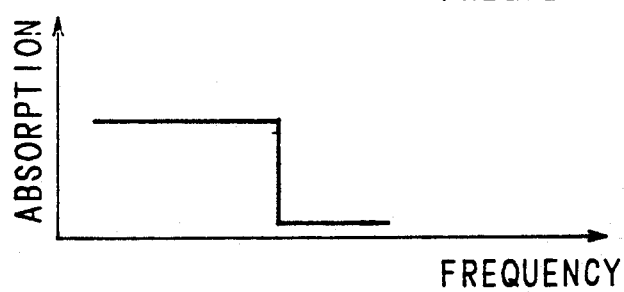
Figure 5E:
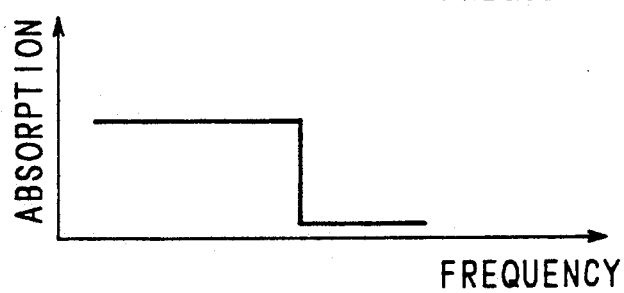
Figure 5F:
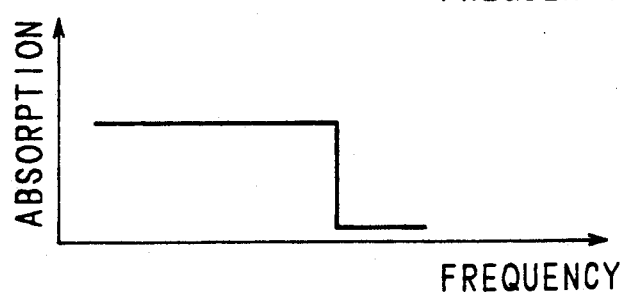
Figure 5G:
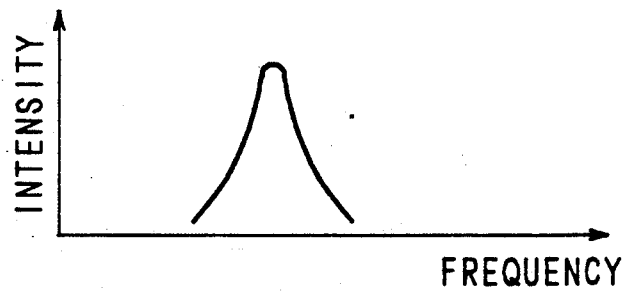
Figure 5H:
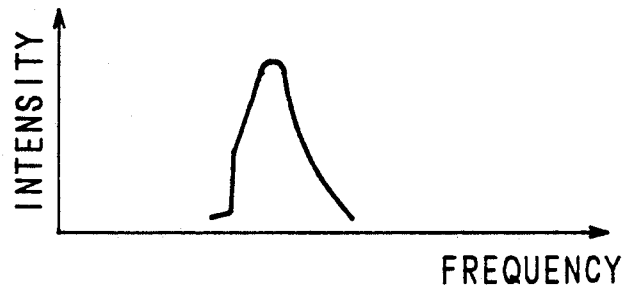
Figure 5I:
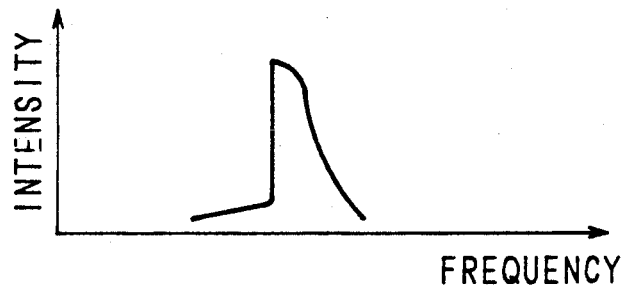
Figure 5J:
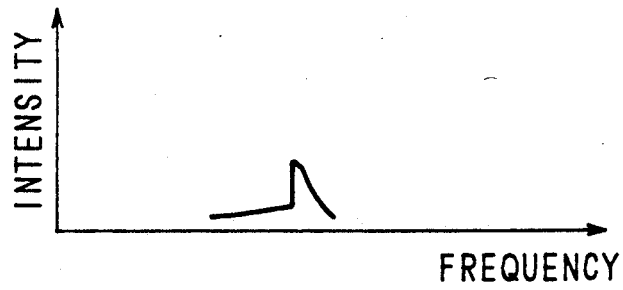
Figure 5K:
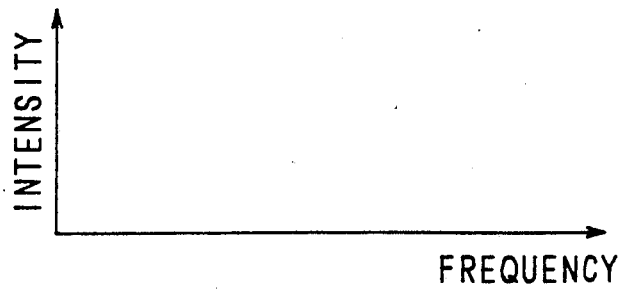

For example, the frequency multiple incident light L2 is the one having a spectrum distribution as shown in FIG. 5(a), and the recording region 51 of the optical recording medium 5 is the one having a light absorption spectrum as shown in FIG. 5(b). In this state, the pump laser beam L1 deflected by the light deflector 3 is irradiated to the recording region 51 so as to cause optical Stark effect, thereby light absorption spectrum is shifted as shown in FIG. 5(c), (d), (e), (f) with the lapse of time. In this state, when the frequency multiple incident light L2 deflected by the light deflector 4 is made to be incident upon the recording region 51 and the frequency multiple outgoing light L3 is obtained as a transmitted light. Then the intensity of the frequency multiple outgoing light L3 in frequency domain detected by the photo-detector 6 is modulated as shown in FIG. 5(g), (h), (i), (j), (k) with the lapse of time.

And if another recording region 52 of the optical recording medium 5 is made to have a light absorption spectrum different from that of the recording region 51, intensity-modulation of different frequency domain can be performed to the frequency multiple incident light L2 by making the pump laser beam L1 and the frequency multiple incident light L2 deflected respectively by the light deflectors 3, 4 to be irradiated to the recording region 52.

In addition, in the aforementioned embodiment, by changing light absorption spectrum of the optical recording medium 5, the frequency multiple outgoing light L3 having been intensity-modulated in a desired frequency domain is obtained. As is understood from the aforementioned equation (1), the shift amount of light absorption spectrum can be varied by the intensity of the pump laser beam L1 and the frequency thereof. Accordingly, the frequency multiple incident light L2 can be intensity-modulated in frequency domain also by controlling the frequency of the pump laser beam L1.

In the abovementioned embodiment, explanation was given on the case where the frequency multiple incident light L2 of one frequency band is intensity-modulated in frequency domain, however, it is also possible that multiple signals are intensity-modulated respectively in different frequency domains at the same time, when the frequency multiple incident light L2 consists of multiple signals different from each other at different frequency bands, the same effect as the above embodiment being obtained.

Figure 6A:
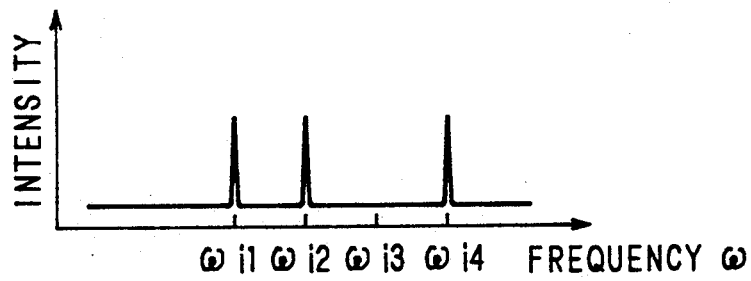
FIGS. 6(a)–6(f) are views showing a modulation state of frequency multiple incident light in another embodiment.
Figure 6B:
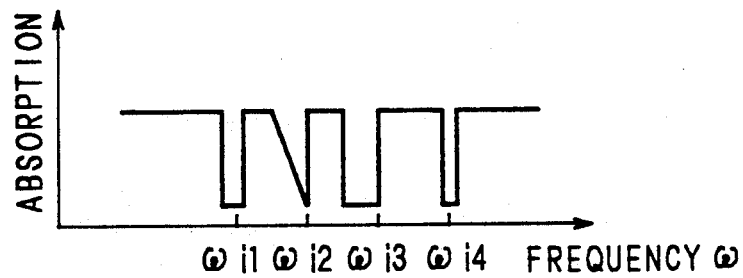
Figure 6C:
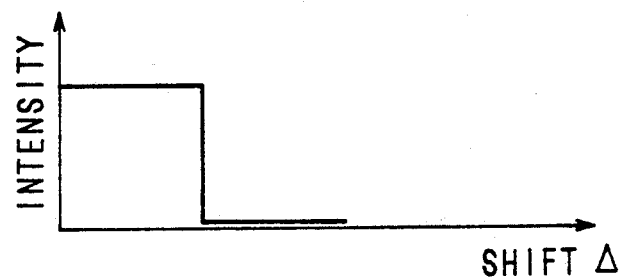
Figure 6D:
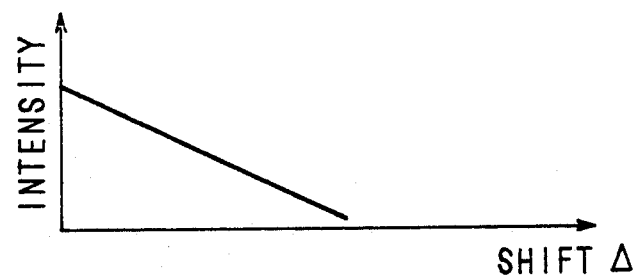
Figure 6E:
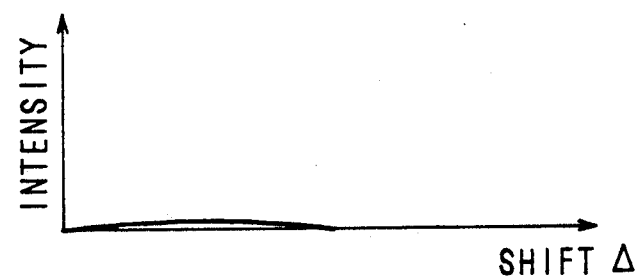
Figure 6F:
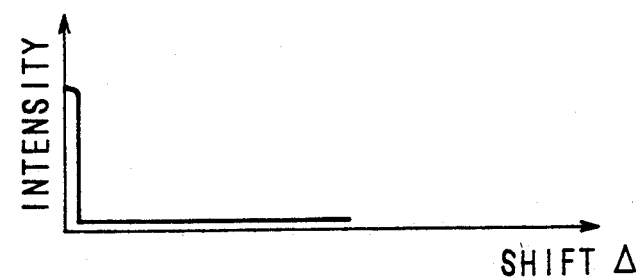

The frequency multiple incident light L2 is assumed to be a multiple signal which has four independent signals at four frequency bands ωi1, ωi2, ωi3, and ωi4, as shown in FIG. 6(a). And if light absorption spectrum of the recording region 51 of the optical recording medium 5 is formed in frequency bands of respective signals, as shown in FIG. 6(b), and light absorption spectrum is shifted to the high-frequency side by optical Stark effect, the four multiple signals at four frequency bands ωi1, ωi2, ωi3, and ωi4 are intensity-modulated in optionally different frequency domains at every frequency band at the same time. Accordingly, it is possible that multiple signals having a plurality of frequency bands are intensity-modulated in optionally different frequency domains at the same time corresponding to the figure of light absorption spectrum formed optionally.

In this case, it is proper that the shift amount of light absorption spectrum by optical Stark effect is small, and signal can be read out in a short time. And if the photo detector 6 is constructed so that only light of specific frequency component may be detected, it doesn't matter that light of broad frequency band is used.

Moreover, in the abovementioned embodiment, explanation was given on the case of modulation apparatus however, it is all right that it is replaced by a switching apparatus or a signal processing apparatus to another frequency multiple signal.

Figure 7A:
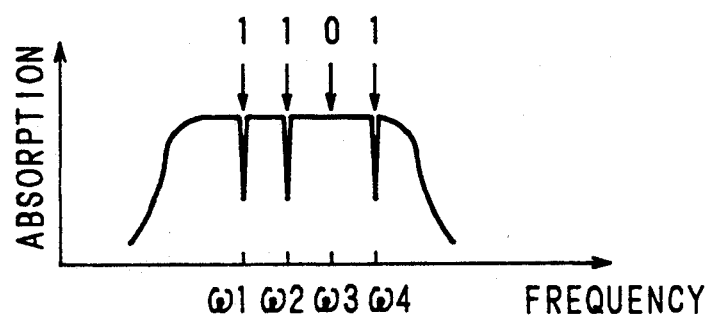
FIGS. 7(a)–7(c) are explanatory views showing light absorption spectrum of an optical recording medium.
Figure 7B:
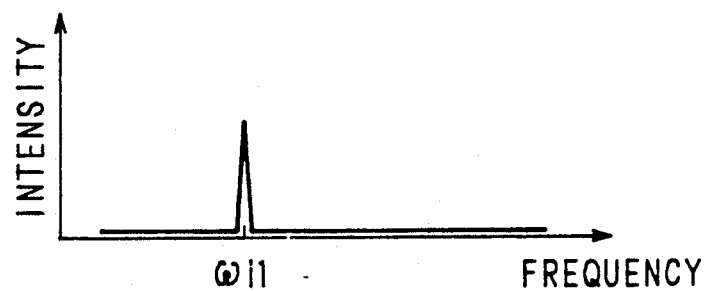
Figure 7C:
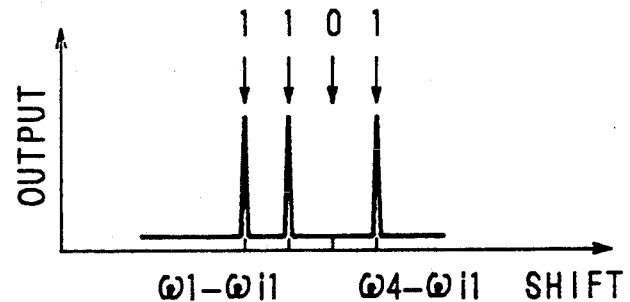

Furthermore, in the abovementioned embodiment, explanation was given on the case where the frequency multiple incident light L2 is made to be a signal, however, it is also all right that light absorption spectrum of the recording region 51 of the optical recording medium 5 is made to be a signal. For example, assume that the optical recording medium 5 is the one which is capable of generating optical hole burning phenomena, and holes as shown in FIG. 7(a) are generated at the recording region 51 and a signal is recorded according to the presence and absence of the holes. At this time, the light of frequency $\omega i1$ as shown in FIG. 7(b) is made to be the frequency multiple incident light L2 and the transmitted light of the recording region 51 to be the frequency multiple outgoing light L3, and the shift amount of light absorption spectrum by optical Stark effect caused by the pump laser beam L1 is to exceed the recorded frequency band width. The output detected by the photo-detector 6 becomes as shown in FIG. 7(c) owing to the shift of light absorption spectrum by optical Stark effect, thereby signal on light absorption spectrum of the recording region 51 can be read out.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A method of processing a multiple-frequency optical signal, wherein multiple optical signals are multiplexed in the frequency domain, the method characterized by the steps of:
    applying said multiple-frequency optical signal to an optical recording medium whose light absorption spectrum may be varied by optical Stark effect according to an externally applied field; and
    detecting an intensity-modulated multiple-frequency optical signal from the optical recording medium.

2. A method of processing a multiple-frequency optical signal, comprising the steps of:
    providing an optical recording medium having a light absorption spectrum which may be varied by optical Stark effect according to an externally applied field;
    shifting the light absorption spectrum of said optical recording medium by by irradiating the optical recording medium with a pump beam;
    making a multiple-frequency light incident upon said optical recording medium; and
    intensity-modulating said multiple-frequency light made incident upon said optical recording medium according to the shift of the light absorption spectrum so as to obtain a multiple-frequency outgoing light.

3. A method of processing a multiple-frequency optical signal as set forth in claim 2, further comprising the step of varying the intensity of said pump beam over a period of time.

4. A method of processing a multiple-frequency optical signal as set forth in claim 2, further comprising the step of varying the frequency of said pump beam over a period of time.

5. A method of processing a multiple-frequency optical signal as set forth in claim 2, wherein said
    optical recording medium causes has a photo-induced reaction.

6. A method of processing a multiple-frequency optical signal, as set forth in claim 5, wherein
    the photo-induced reaction is a photochromic reaction.

7. A method of processing a multiple-frequency optical signal as set forth in claim 5, wherein
    the photo-induced reaction is a photo-chemical reaction.

8. A method of processing a multiple-frequency optical signal as set forth in claim 2, wherein said
    optical recording medium causes has an electric-induced reaction.

9. A method of processing a multiple-frequency optical signal as set forth in claim 2, wherein
    said multiple-frequency light is a signal of one frequency band of more than one frequency.

10. A method of processing a multiple-frequency optical signal as set forth in claim 2, wherein
    said multiple-frequency light is a signal comprised of a plurality of distinct frequency bands.

11. An apparatus for processing a multiple-frequency optical signal, comprising:
    an optical recording medium having a recording region and a light absorption spectrum which may be varied by optical Stark effect caused by an externally applied field;
    first light generating means for generating a pump beam which irradiates a recording region of the optical recording medium;
    second light generating means for generating a multiple-frequency light to be incident upon the recording region of said optical recording medium; and
    means for detecting a transmitted light from the recording region of said optical recording medium.

12. An apparatus for processing a multiple-frequency optical signal as set forth in claim 11, further comprising:
    first deflecting means disposed between said first light generating means and said optical recording medium, for deflecting said pump beam; and
    second deflecting means disposed between said second light generating means and said optical recording medium, for deflecting said multiple-frequency light.

13. A recording apparatus for recording optical information comprising:
    an optical recording medium having a plurality of recording regions, each recording region having a light absorption spectrum which may be varied by optical Stark effect caused by an externally applied field;
    first irradiating means for irradiating a pump beam to each of the recording regions of said optical recording medium;

second irradiating means for irradiating a multiple-frequency incident light to each of the recording regions of said optical recording medium; and means for detecting a transmitted light from each of the recording region of said optical recording medium.

14. A recording apparatus as set forth in claim 13, wherein said optical recording medium comprises materials which cause a photo-induced reaction.

15. A recording apparatus as set forth in claim 13, wherein said optical recording medium comprises material which cause an electric-induced reaction.

16. A recording apparatus as set forth in claim 13, further comprising:

first deflecting means disposed between said first irradiating means and said optical recording medium, for deflecting said pump beam; and second deflecting means disposed between said second irradiating means and said optical recording medium, for deflecting said multiple-frequency light.

17. A recording apparatus as set forth in claim 14, wherein the photo-induced reaction is a photochromic reaction.

18. A recording apparatus as set forth in claim 14, wherein the photo-induced reaction is a photo-chemical reaction.

19. A recording apparatus as set forth in claim 13, further comprising means for varying the intensity of said pump beam over a period of time.

20. A recording apparatus as set forth in claim 13, further comprising means for varying the frequency of said pump beam over a period of time.

21. A recording apparatus as set forth in claim 13, wherein said multiple-frequency light is a signal of one frequency band of more than one frequency.

22. A recording apparatus as set forth in claim 13, wherein said multiple-frequency light is a signal comprised of a plurality of distinct frequency bands.

* * * * *